Patented Apr. 28, 1931

1,802,563

UNITED STATES PATENT OFFICE

LUDWIG KÜHN AND ERICH GEISSLER, OF CHARLOTTENBURG, NEAR BERLIN, GERMANY, ASSIGNORS TO THE FIRM: DR. ERICH F. HUTH G. M. B. H., OF BERLIN, GERMANY

HIGH-FREQUENCY CURRENT-GENERATING SYSTEM

Application filed January 23, 1924, Serial No. 688,054, and in Germany January 24, 1923.

This invention relates to high frequency current generating systems and is particularly applicable to wireless telephone and telegraph sending systems.

Cathode tube oscillators and particularly high power tubes are often used in combination with a sending arrangement in which, during the silent periods of the Morse signals the oscillation tube receives no or only a very slight amount of current. Inasmuch as in such systems the rectified alternating current is obtained from an A. C. generator of a frequency of 500 cycles, the potential of the A. C. generator and therefore to an exaggerated extent also the rectified potential is very rapidly increased during the silent periods. Due to these intermittent abnormal values in the potential during the sending, the high potential transformer, the rectifying arrangement and also the sender itself will be overloaded so that, in order to avoid fire hazards, heavier insulation is necessary than would be the case without such jumps in the potential. In order to avoid this expense it is possible to provide a closed iron core choke coil in the generator circuit as giving the most satisfactory operation, but it is not essential for the magnetic core to be closed, the self induction of said coil being reduced to a minimum by means of the current that is used by the anodes of the oscillating tubes connected therewith. When the current supplied to the anodes is interrupted, e. g. in the case of grid control by the opening of the grid circuit, then the magnetizing action due to the passage of the anode current through the choke coil will cease, the self induction of this coil will suddenly increase and therefore no appreciable potential increase will occur in the alternating current generator; even if this increase occurs the transformer, the rectifying arrangement, etc. will receive practically the same potential as during the signaling periods, since the excess potential will be lost in the choking arrangement.

The object of the present invention is to eliminate the effect of the increase in potential in the generator during the silent periods by very simple means through the agency of the choke coil mentioned above which is provided in the generator circuit but which carries only a single winding.

Figure 1:
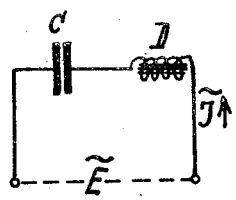
Figs. 1 and 2 are, respectively, a circuit diagram and a curve for explaining the theory of the invention.

The physical phenomena that are employed in this invention are known as "reversible resonance" and are fully explained in Martienssen Physikalische Zeitschrift of May 15, 1910, page 448 to 460. Briefly stated, these phenomena are as follows: If the current flowing through a condenser C and an iron core choke coil D connected in series (Fig. 1) is continuously increased then it will be found (Fig. 2) that if in the beginning the potential (the ordinate in Fig. 2) increased with the current (the abscissa in Fig. 2) then, upon the current being further increased, the potential will suddenly drop down to a certain point beyond which the potential will again increase with the current. The currents and potentials are, of course, of the alternating kind.

Figure 2:
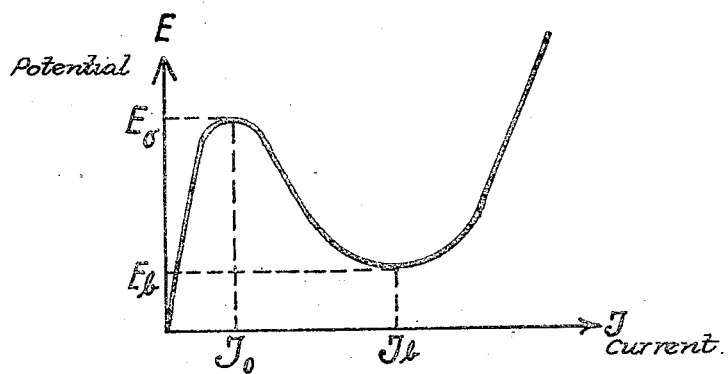

The physical cause of such a relation of current and voltage may be found in the fact that an iron core has the property of changing its magnetic properties, with magnetizing current. Thus, at a certain value of the magnetizing current the permeability of iron is at a maximum, and therefore, the inductance, which is a function of the permeability is also at a maximum, that is, the point marked $I_o$ on Figure 2. After passing this point the permeability is decreasing, thus the inductance is decreasing and the curve of voltage and current is dropping, as illustrated in Figure 2.

Figure 3:
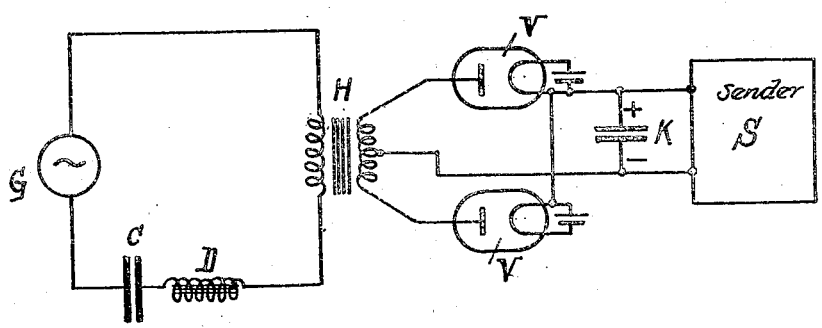
Fig. 3 shows an embodiment of the invention.

These phenomena of drops of potential in response to increases in the current may be used in key controlled tube senders. The circuit arrangement exemplifying such system is illustrated in Fig. 3. G is an A. C. current generator which is connected in series with a condenser C, a choke coil D and a transformer H through which the rectifier is supplied with current. The rectifier may consist of two valves V which may be provided in any well known manner. A further condenser K is connected in parallel with these valves through which valves the schematically illustrated sender S is supplied with current. The sender S may consist of one or more cathode tubes used as oscillation generators, the sender key, not shown, controlling the grids of these tubes, etc. The tubes V, being rectifiers, are correctly shown without grids.

With reference to the operation of this system let us first assume that the tubes in sender S oscillate and that the gird circuit in S is closed. In accordance with the energy absorbed by the tube sender, the alternating current supplied by the generator is equal to $I_b$ (Fig. 2). If the choke coil and the condenser are properly proportioned then this surrent will coincide with the lower "reversible" resonance point $I_b$ of Fig. 2. The potential existing at the choke coil and condenser combination of Fig. 1 will be $E_b$. If the sending ceases, e. g. the grid circuit in S is opened, then the current drops back to about the magnetizing current $I_o$ of the transformer H. As shown in Fig. 2, the potential on the choke coil and condenser combination is now increased to $E_o$ so that the increase in the potential of the alternating current generator is partially or even excessively compensated. Obviously, the maximum protection will be obtained if during idle running and full load we move between the values $E_o$ and $E_b$. In practice it is only necessary to approach these limits, and the theoretical limits herein specified should not be considered as determining the scope of the invention.

What we claim is:

1. In a system for sending signals, a continuously operating alternating current generator, a rectifier connected between it and a sender, and a condenser and an iron core choke coil connected in series between said rectifier and generator for maintaining the voltage impressed on the sender substantially constant.

2. In a system for sending signals, a current generator, a sender supplied thereby, and a capacitance and iron core inductance between said generator and sender, said capacitance and inductance being connected in series and so proportioned that the current required is always restricted within predetermined limits.

3. In a sending system for intermittent signals, a current generator, a sender connected therewith, means operable at will for varying the operation of said sender, and a capacitance and an iron core inductance in series between said generator and sender and so proportioned that the current supplied to said sender during the various stages of its operation is of a magnitude to secure magnetic saturation necessary for the upper and lower "reversible resonance" limits.

4. In a transmitting system, the combination with a continuously operating source of alternating current and a sender connected therewith, of means for maintaining substantially constant the terminal voltage at the sender comprising an iron core inductance and a capacitance connected in series between the source of current and the sender.

5. In a transmitting system, the combination with a continuously operating source of alternating current and a sender connected therewith through a rectifier, of means for maintaining substantially constant the terminal voltage on the rectifier comprising an iron core inductance and a capacitance connected in series between the source of current and the rectifier.

6. In a transmitting system, the combination with a continuously operating source of alternating current and a sender connected therewith through a rectifier, of means for maintaining substantially constant the terminal voltage on the rectifier comprising an iron cored inductance and a capacitance connected in series between the source of current and the rectifier, the inductance being of such dimensions that presence of the load current supplied to the rectifier magnetizes the core and reduces its inductance, while the no load current supplied to the rectifier leaves the core relatively less magnetized and with relatively high inductance.

7. In a signal transmitting circuit, a continuously operating source of alternating current, a transmitter including a thermionic oscillator, an iron core inductance and a capacitance in series between the source of current and the oscillator whereby the terminal voltage at the transmitter is held substantially constant.

8. Means for maintaining substantially constant the terminal voltage at the transmitter in a system wherein a continuously operating alternating current generator is connected to a thermionic oscillator, which means comprises an iron cored inductance between the source and oscillator, the constants of said inductance being such that it normally operates in a highly saturated state, so that with a reduced load its effective reactance is increased, thereby maintaining the voltage substantially constant.

9. In a transmitting system having a continuously operating source of alternating current connected to a thermionic oscillator of the transmitter through a rectifier and in which the voltage on the generator increases considerably at no load, means for maintaining substantially constant the voltage on the rectifier and consequent terminal voltage at the transmitter which comprises an iron core inductance and a capacitance in series between the source and rectifier.

10. In a signalling system, the combination with a rectifier of an electrical device electrically connected thereto, a source of power, a transformer connecting said device to said supply and means of maintaining substantially constant voltage at said rectifier output terminals comprising a saturated iron core inductance connected in the primary of said transformer.

11. In a signalling system, the combination of a source of alternating current and a rectifier with an electrical device, connected to said source through said rectifier and means for maintaining substantially constant voltage at said rectifier output terminals, comprising a saturated iron core inductance and a condenser co-operating therewith, connected between said source and said rectifier.

In testimony whereof we affix our signatures.

LUDWIG KÜHN.
ERICH GEISSLER.